US009151255B2

(12) United States Patent
Sayer

(10) Patent No.: US 9,151,255 B2
(45) Date of Patent: Oct. 6, 2015

(54) MARINE FUEL SYSTEM WITH SPILL CONTROL FEATURE

(75) Inventor: John L. Sayer, Westfield, IN (US)

(73) Assignee: Carter Fuel Systems, LLC, Cleveland, OH (US)

( * ) Notice: Subject to any disclaimer, the term of this patent is extended or adjusted under 35 U.S.C. 154(b) by 549 days.

(21) Appl. No.: 13/242,555

(22) Filed: Sep. 23, 2011

(65) Prior Publication Data

US 2013/0078878 A1 Mar. 28, 2013

(51) Int. Cl.

| F02M 37/20 | (2006.01) |
|---|---|
| F02M 37/00 | (2006.01) |
| F02M 37/08 | (2006.01) |
| F02B 61/04 | (2006.01) |
| F02M 31/20 | (2006.01) |
| B63H 21/38 | (2006.01) |
| B63B 17/00 | (2006.01) |

(52) U.S. Cl.
CPC ............ *F02M 37/007* (2013.01); *B63H 21/38* (2013.01); *F02B 61/04* (2013.01); *F02M 31/20* (2013.01); *F02M 37/08* (2013.01); *B63B 17/0036* (2013.01); *Y02T 10/126* (2013.01)

(58) Field of Classification Search
CPC .............. F02M 37/20; F02M 25/0836; B32B 2307/304
USPC ............ 123/516–517; 440/88 F; 220/592.2, 220/592.26, 592.27, 62, 801; 215/355, 364
See application file for complete search history.

(56) References Cited

U.S. PATENT DOCUMENTS

| 2,223,395 A | 12/1940 | Van Buren |
|---|---|---|
| 2,250,510 A | 7/1941 | Van Buren |
| 4,167,598 A | 9/1979 | Logan et al. |
| 4,340,129 A | 7/1982 | Salyers |
| 4,782,913 A | 11/1988 | Hoffmann et al. |
| 5,108,817 A | 4/1992 | Kidd et al. |
| 5,503,903 A | 4/1996 | Bainbridge et al. |
| 5,633,067 A | 5/1997 | Illbruck et al. |
| 5,645,004 A | 7/1997 | Holland |
| 5,647,331 A | 7/1997 | Swanson |
| 5,766,395 A | 6/1998 | Bainbridge et al. |

(Continued)

FOREIGN PATENT DOCUMENTS

JP 2003184662 A 7/2003

OTHER PUBLICATIONS

D.D. Joseph, Questions in Fluid Mechanics: Understanding Foams & Foaming, May 1997, ASME Journal of Fluids Engineering, vol. 119, Issue 3, p. 1.*

(Continued)

*Primary Examiner* — Hung Q Nguyen
*Assistant Examiner* — Josh Campbell
(74) *Attorney, Agent, or Firm* — Jones Day

(57) ABSTRACT

A spill resistant fuel supply system (16) for a marine engine (12). The system (16) includes a generally sealed housing (46) in which is disposed a vapor separator (26), a high pressure pump (28) and/or a suction pump (24). The housing (46) prevents fuel that might leak from these components from openly collecting in the marine vessel (10). The housing (46) includes one or more walls (48, 50, 52) formed with included air columns (58) which act as thermal barriers to reduce the amount of heat energy transferred from the outside in. The included air columns (58) are preferably arrayed in side-by-side fashion and closed at both ends to trap air therein.

14 Claims, 7 Drawing Sheets

(56) References Cited

U.S. PATENT DOCUMENTS

| | | | |
|---|---|---|---|
| 5,996,730 A | 12/1999 | Pirchl | |
| 6,032,190 A | 2/2000 | Ritzenna | |
| 6,032,654 A | 3/2000 | Kato | |
| 6,070,718 A * | 6/2000 | Drabwell | 206/216 |
| 6,136,273 A * | 10/2000 | Seguin et al. | 422/569 |
| 6,202,786 B1 * | 3/2001 | Pfaffelhuber et al. | 181/286 |
| 6,202,878 B1 * | 3/2001 | Cook | 220/255 |
| 6,422,207 B1 * | 7/2002 | Kolb et al. | 123/461 |
| 6,455,005 B1 * | 9/2002 | Berray et al. | 422/569 |
| 6,527,603 B1 | 3/2003 | Wickman et al. | |
| 6,532,888 B1 | 3/2003 | Enik | |
| 6,553,974 B1 | 4/2003 | Wickman et al. | |
| 6,558,628 B1 * | 5/2003 | Reo | 422/569 |
| 6,857,419 B1 * | 2/2005 | Harvey et al. | 123/509 |
| 6,957,542 B1 | 10/2005 | Kido et al. | |
| 7,011,181 B2 | 3/2006 | Albin, Jr. | |
| 7,114,491 B2 * | 10/2006 | Hamada et al. | 123/516 |
| 7,182,172 B2 | 2/2007 | Albin, Jr. | |
| 7,503,314 B2 * | 3/2009 | Achor | 123/509 |
| 7,824,587 B2 | 11/2010 | Sato | |
| 2002/0195448 A1 * | 12/2002 | Mathus et al. | 220/23.4 |
| 2004/0003797 A1 | 1/2004 | Nomura | |
| 2004/0041428 A1 | 3/2004 | Tompson | |
| 2004/0129493 A1 | 7/2004 | Campbell | |
| 2006/0035058 A1 * | 2/2006 | Ogawa et al. | 428/131 |
| 2006/0048757 A1 | 3/2006 | Harvey | |
| 2007/0085364 A1 | 4/2007 | Sato | |
| 2007/0240686 A1 * | 10/2007 | Kamito et al. | 123/509 |
| 2009/0025805 A1 * | 1/2009 | Makino et al. | 137/587 |
| 2009/0029109 A1 * | 1/2009 | Seth et al. | 428/158 |

OTHER PUBLICATIONS

International Search report PCT/US2012/053935 mailed on Dec. 13, 2012.

* cited by examiner

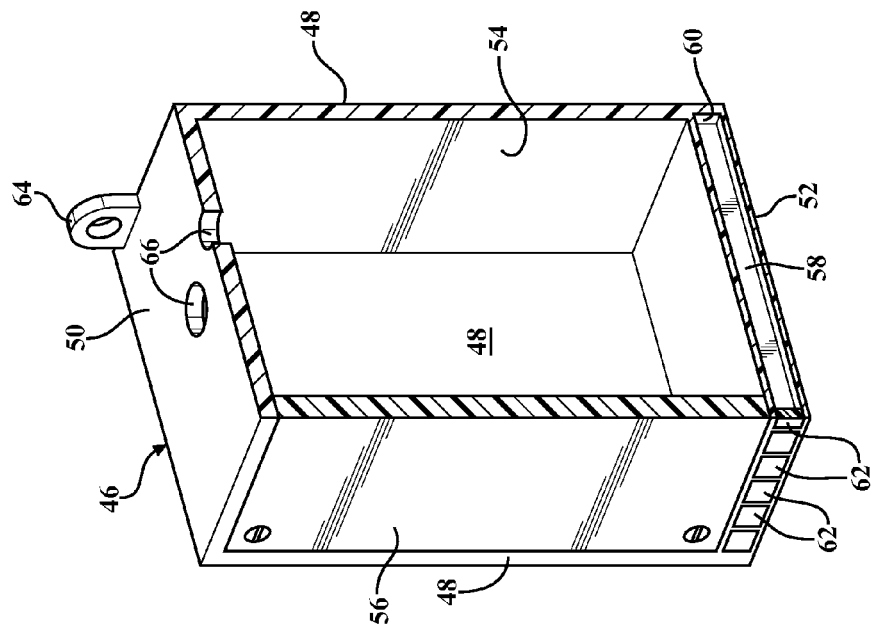
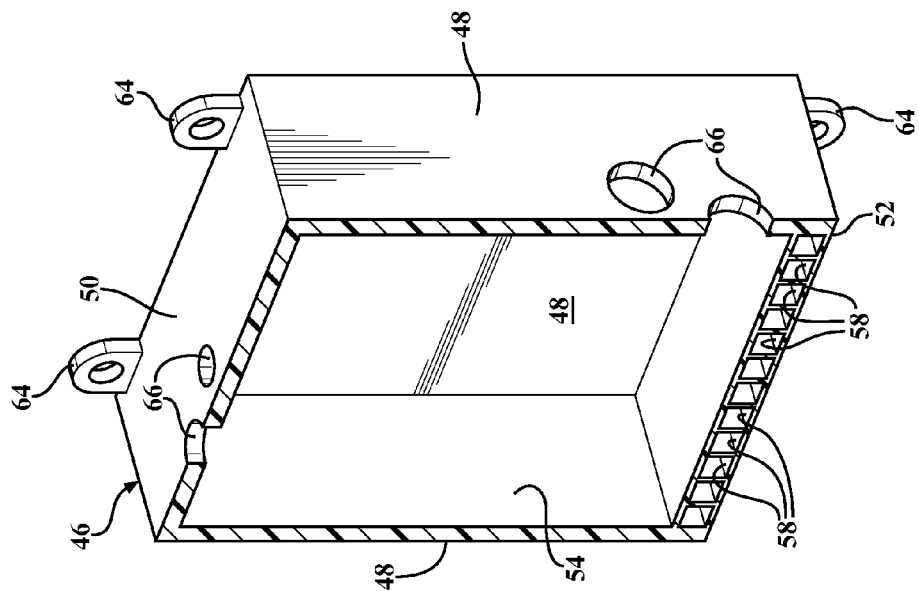

MARINE FUEL SYSTEM WITH SPILL CONTROL FEATURE

CROSS REFERENCE TO RELATED APPLICATIONS

None.

BACKGROUND OF THE INVENTION

1. Field of the Invention

This invention relates generally to a fuel system for a marine internal combustion engine, and more particularly toward such a fuel system including a fuel spillage containment device.

2. Related Art

Many watercraft include an internal combustion engine configured to propel the craft through the water. The fuel supply system for such an engine is generally arranged so that fuel is supplied from a tank and delivered to the engine under high pressure. Engines are often placed in an enclosed, poorly ventilated space. The high temperature surrounding a marine fuel system and the inherent vibrations created by close proximity to the engine and jarring boat movement all work against the fuel system to increase the production of fuel vapors. Vapor in the fuel reduces its effectiveness and the efficiency of the pump used to deliver the fuel to the engine. Vapor separators have been developed to address this problem.

In order to limit the distance fuel must be pumped under positive pressure, it is common to locate the vapor separator and high pressure pump very close to the hot engine. Another problem encountered in marine applications is the potential for leaked fuel to collect in the watercraft thereby presenting a fire hazard. The prospect of a fire in a watercraft is considered substantially more serious than a fire in an automobile, due to the fact that fire in a watercraft can force occupants to evacuate into open water. The US Coast Guard has promulgated regulations pertaining to fuel systems used for marine vessels. One such regulation may be found in 33 CFR §183.590, which specifies a current fire test for marine fuel systems. In order to comply with this and other standards, a marine fuel system is required to meet the specified criteria without leaking fuel externally.

Examples of various marine fuel supply systems may be found by reference to U.S. Pat. No. 5,647,331 to Swanson issued Jul. 15, 1997, U.S. Pat. No. 6,032,654 to Kato issued Mar. 7, 2000, and U.S. Pat. No. 6,553,974 to Wickman et al. issued Apr. 29, 2003. Another example may be found by reference to U.S. Pat. No. 7,503,314 to Achor issued Mar. 17, 2009 and assigned to the assignee of the subject invention. The entire disclosure of U.S. Pat. No. 7,503,314 is hereby incorporated by reference and relied upon.

U.S. Pat. No. 5,645,004 to Holland, issued Jul. 8, 1997 and U.S. Pat. No. 6,532,888 to Enik, issued Mar. 18, 2003 describe various containment devices for marine vessels which recognize the issues and concerns associated with fuel spilled in marine applications. U.S. Pat. No. 5,645,004, for example, teaches the construction of an open tray placed near the site of a potential fuel spill. The tray is made of a special absorbent material designed to capture, contain and solidify any leaks or spills that may occur.

There is, nevertheless, a continuing desire to develop new and improved fuel spillage containment devices that may be implemented in hot, jarring marine applications. Such containment devices can preferably accommodate new fuel system installations, as well as retrofit installations in existing fuel systems. A containment device is also preferably relatively inexpensive, easy to manufacture, and easy to install.

SUMMARY OF THE INVENTION

A spill resistant fuel supply system is provided for a marine engine. The fuel supply system comprises a vapor separator configured to receive liquid fuel from a fuel tank via a supply line conduit. A high pressure pump is provided for transferring liquid fuel under positive pressure from the vapor separator to an internal combustion marine engine. The improvement comprises a housing substantially enclosing at least one of the vapor separator and the high pressure pump. The housing includes surrounding side walls and a top wall and a bottom wall. The top and bottom walls respectively adjoin the side walls to form an enclosed space within which to contain liquid fuel if leaked therein. At least one of the side walls and the top and the bottom wall have an included air column. The housing is insulated from the heat of the engine by the thermal insulating qualities of air within the included air column.

The housing of the present invention provides an enclosure for either or both of the vapor separator and high pressure pump so that in the event of fuel leakage or spillage there will not be external leakage. The included air column in at least one wall is effective to reduce the amount of heat energy that passes from the engine or other mounting location to the components placed inside the housing.

BRIEF DESCRIPTION OF THE DRAWINGS

These and other features and advantages of the present invention will become more readily appreciated when considered in connection with the following detailed description and appended drawings, wherein:

FIG. 6 is a cross-sectional view as taken generally along lines 6-6 in FIG. 4;

FIG. 7 is a cross-sectional view as taken generally along lines 7-7 in FIG. 4;

DETAILED DESCRIPTION OF THE PREFERRED EMBODIMENT

Referring to the figures, wherein like numerals indicate like or corresponding parts throughout the several views, an exemplary depiction of a marine vessel is generally shown at 10 including an internal combustion engine, generally indicated at 12. The engine 12 is here shown in the configuration of an inboard type, however it is to be understood that the engine 12 could be an outboard, inboard/outboard or other engine type. The engine 12 is powered by liquid fuel, such as diesel or gasoline, contained within an on-board fuel tank 14. A spill resistant fuel supply system according to the present invention is generally indicated at 16 and interconnects the tank 14 and engine 12 for delivering fuel to the engine 12 as needed for proper operation. A fill line 18 is used to add liquid fuel to the tank 14. A vent line 20 vents vapors and air from the tank 14 according to standard practices.

Figure 2:
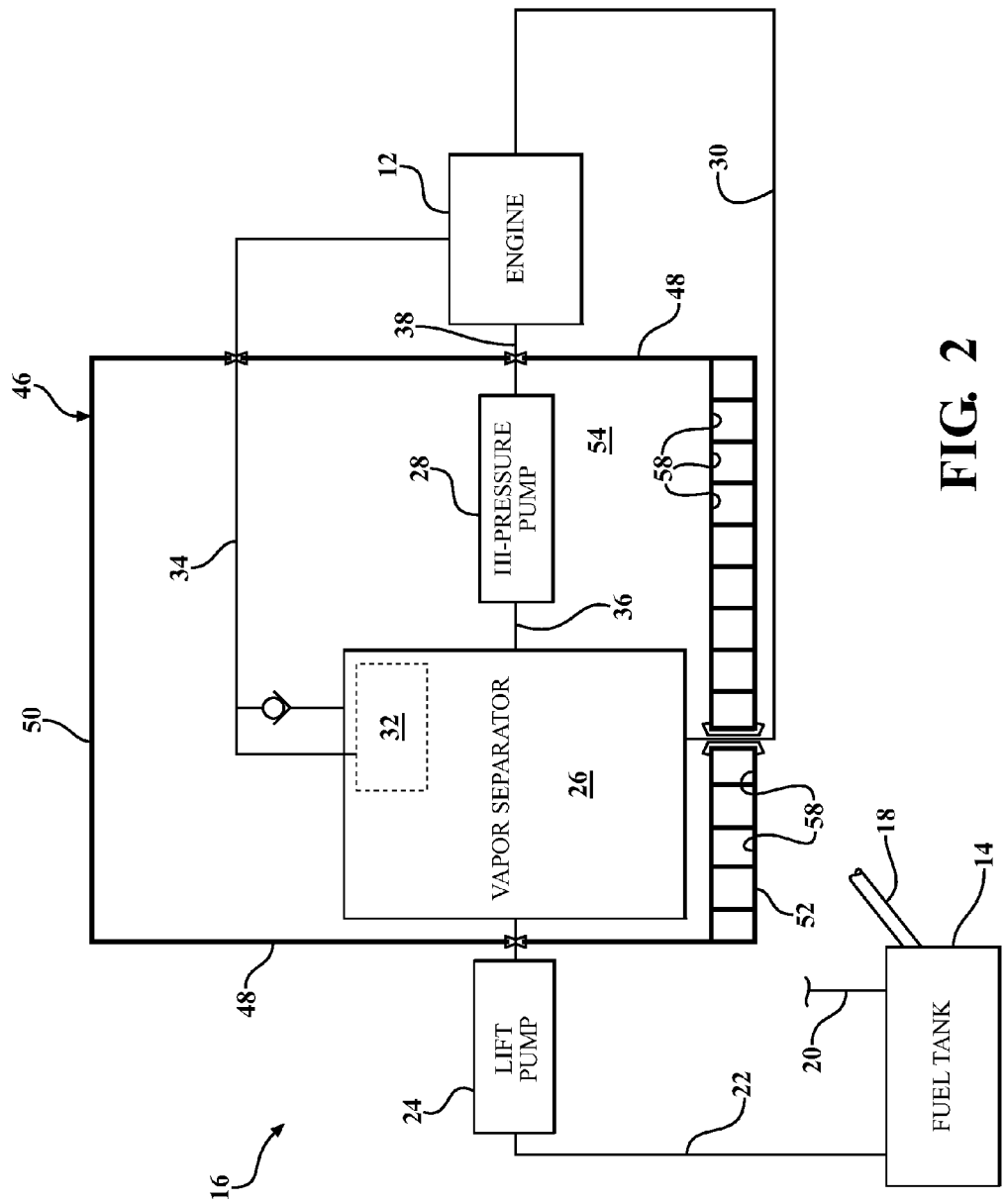
FIG. 2 is a simplified schematic view of a fuel supply system according to an embodiment of the invention.
Figure 3:
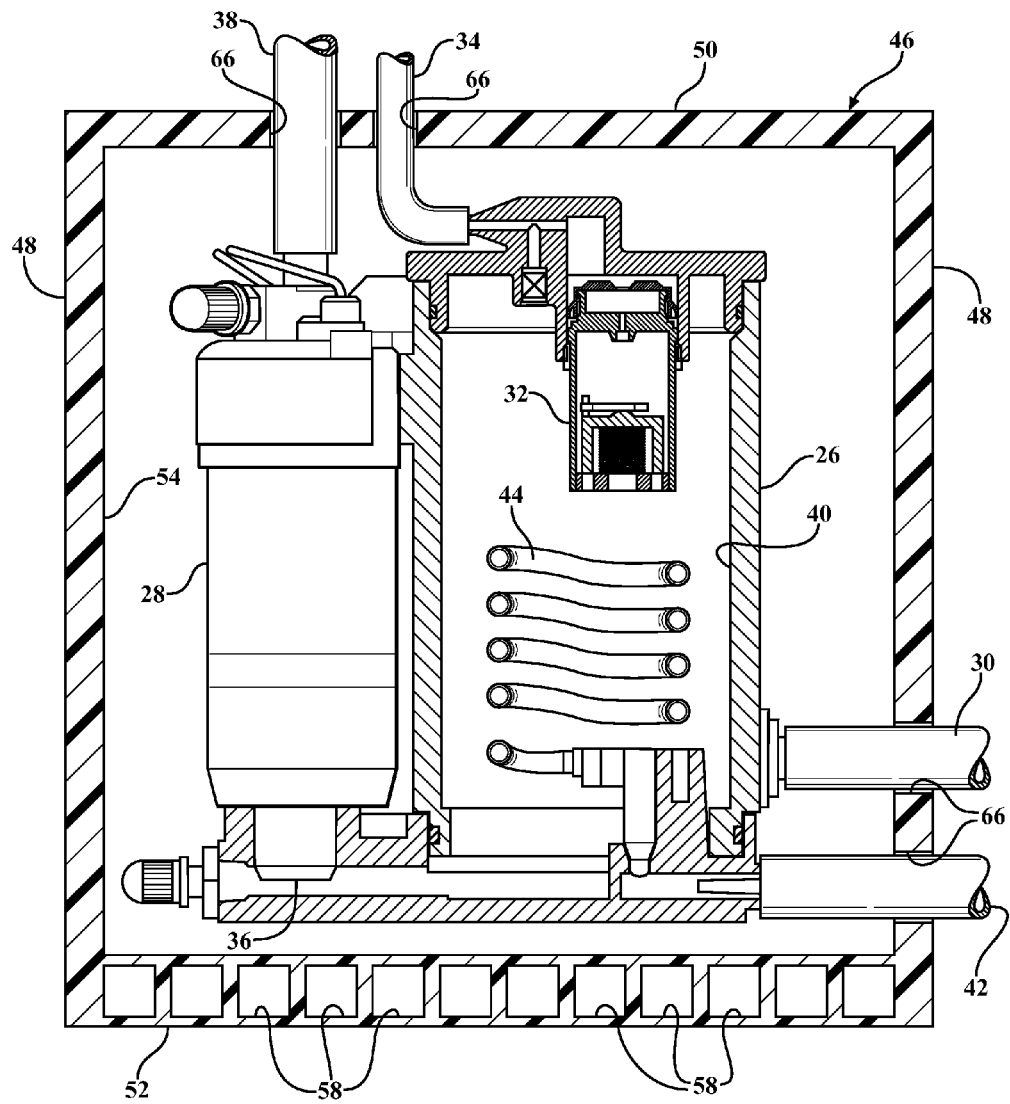
FIG. 3 is a cross-sectional view according to one embodiment of the present invention showing both a vapor separator unit and a high pressure pump of a marine fuel supply system disposed within a housing having a bottom wall formed with a plurality of included air columns arranged side-by-side in a linear array.

The fuel supply system 16 is shown schematically in FIG. 2 including a supply line 22 extending from the fuel tank 14 to a low pressure lift or suction pump 24. The suction pump 24 sucks fuel from the tank 14 through the supply line 22 and delivers it to a vapor separator 26. An exemplary, cross-sectional detail of one possible vapor separator 26 configuration is shown in FIG. 3. The vapor separator 26 collects and discharges vapors given off from the incoming low pressure fuel and also from the hot, agitated unused fuel returning from the engine 12. A high pressure pump 28 then pumps the fuel under pressure into a fuel injector system or other feed system of the engine 12 to be consumed in the normal course of operation. Unused fuel is returned to the vapor separator 26 via return line 30. A vent valve device 32 may be provided as part of the vapor separator 26 via a vapor line 34. When connected to the engine intake vacuum system, the vapor line 34 creates a negative pressure at the vent valve 32 so that fuel vapors can be drawn and cycled through the engine 12. Other venting arrangements than those depicted in FIG. 2 are possible.

Those of skill will understand that the specific configuration of vapor separator 26 can take many forms. In this example, the high pressure fuel pump 28 includes a fuel intake 36 at its bottom end and an outlet 38 at its top end leading directly to the engine 12. The vapor separator 26 shown in FIG. 3 includes a hollow, generally cylindrical housing forming a hollow interior chamber 40. A fuel inlet 42 from the suction pump 24 extends through the bottom of the vapor separator 26 and communicates with the hollow interior chamber 40. An optional cooling coil 44 is positioned in the chamber 40 and circulates cooling fluid to minimize vaporization.

Figure 4:
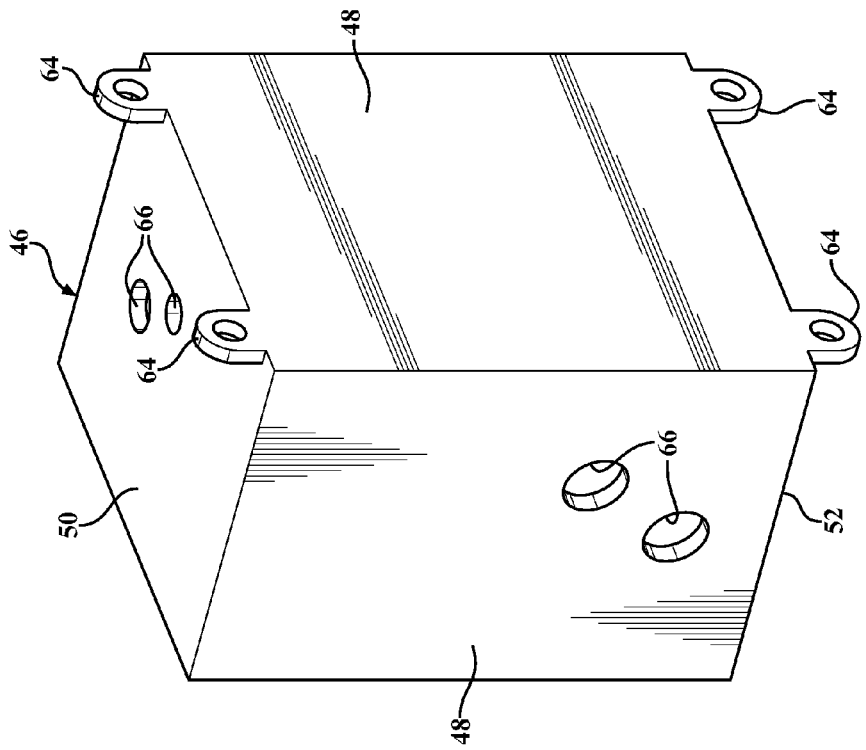
FIG. 4 is a perspective view of the housing according to one embodiment of the present invention.
Figure 5:
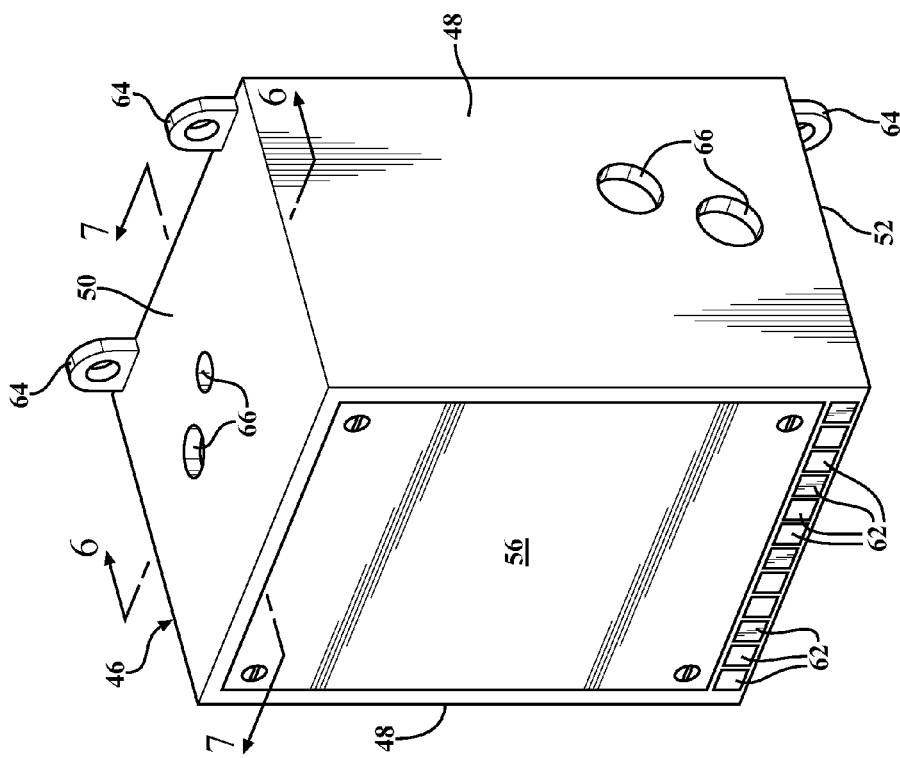
FIG. 5 is a view of the housing as in FIG. 4 but taken from a different perspective.

According to the present invention, a housing, generally indicated at 46, is provided for substantially enclosing at least one of the vapor separator 26 and the suction pump 24 and the high pressure pump 28 in a contained hollow unit. FIGS. 4 and 5 provide exemplary, external perspective views of such a housing 46 according to one possible embodiment including surrounding walls. In the exemplary box-like configuration illustrated, the surrounding walls include side walls 48, a top wall 50 and a bottom wall 52. The top 50 and bottom 52 walls respectively adjoin the side walls 48 to form an enclosed space 54 as shown in FIGS. 6 and 7. The enclosed space 54 is effective to contain liquid fuel that may inadvertently leak or spill from the components contained inside. In the illustrations, the components inside the housing 46 include both the vapor separator 26 and high pressure pump 28. Alternatively, any combination of one or more of the suction pump 24, vapor separator 26 and high pressure pump 28 may be disposed inside the housing 46.

The housing 46 includes a removable cover 56 to permit access to the enclosed space 54. The cover 56 is shown in FIG. 4 as being located on one of the side walls 48, however this is not the only possible location. Alternatively, the cover 56 could be formed in or make up the top wall 50, or alternatively the bottom wall 52, or portions of several walls. The cover 56 can be hinged, clipped, adhered, or in any other way placed in position relative to the walls 48, 50, 52 so as to enable access to the components contained in the enclosed space 54 during installation, inspection and/or maintenance procedures.

Figure 1:
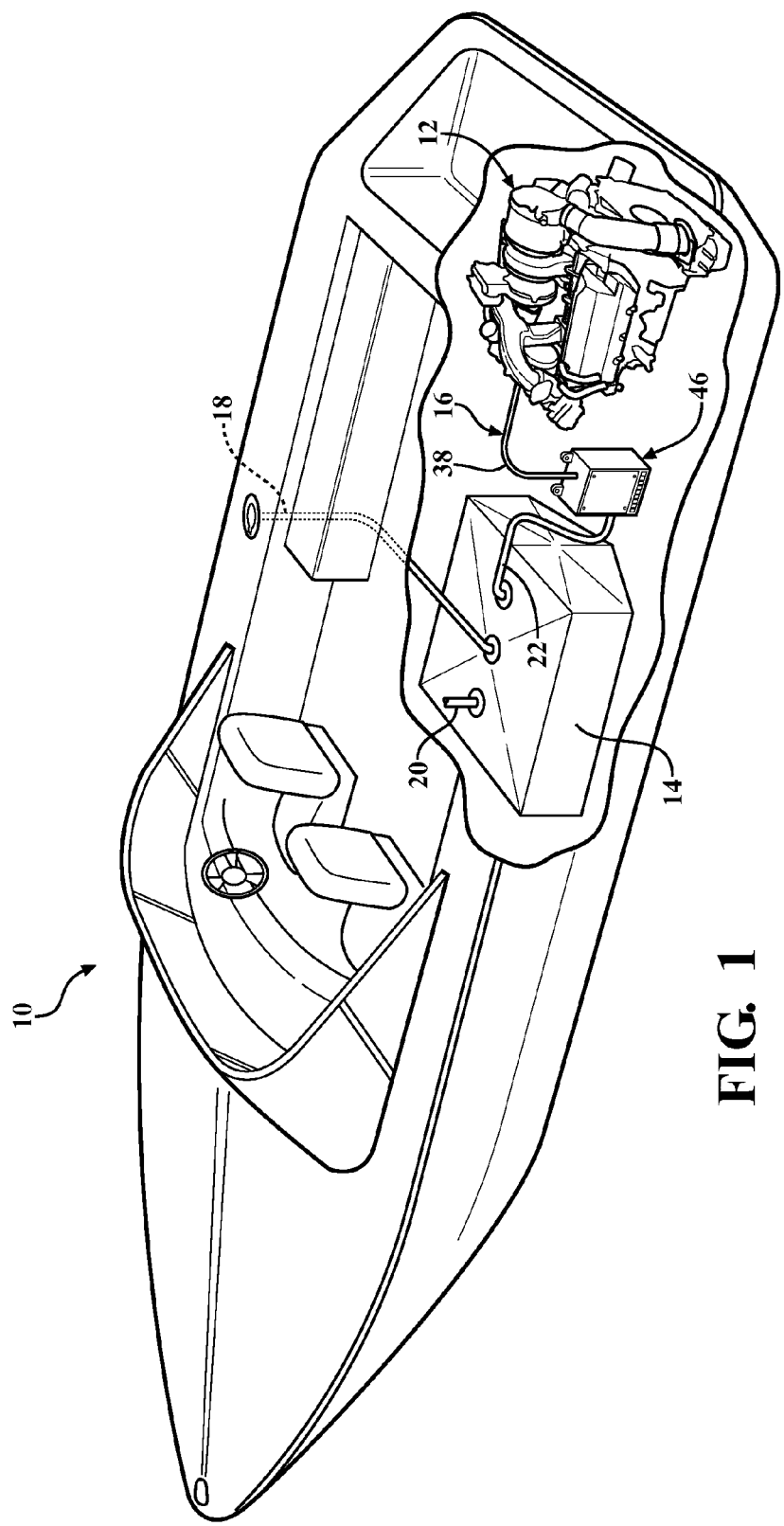
FIG. 1 is a perspective view of an exemplary marine vessel including an internal combustion engine powered by liquid fuel fed via a fuel supply system according to one embodiment of the present invention.
Figure 8:
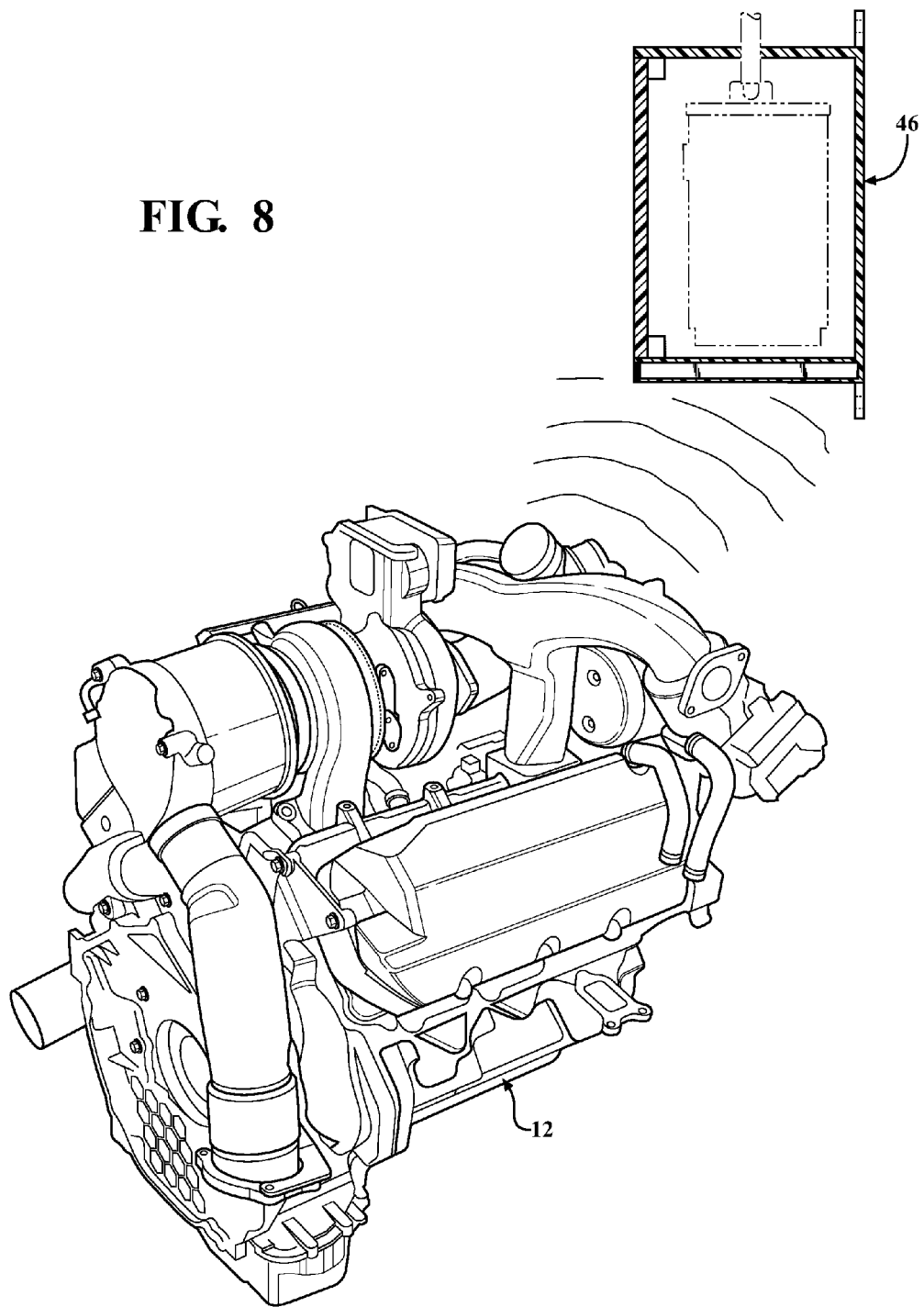
FIG. 8 is a schematic view showing the subject housing in cross-section and disposed adjacent to a hot, vibrating internal combustion marine engine.

At least one of the side walls 48, top wall 50 and bottom wall 52 are configured with an included air column 58. The included air column 58 provides an air-insulated wall section which acts as an enhanced thermal barrier to reduce the amount of heat energy transferred from outside the housing 46 to the components located in the enclosed space 54. Thus, if the housing 46 is located near the engine 12, as shown in FIGS. 1 and 8, heat radiating from the engine 12 will encounter higher resistance to conductive transmission into the enclosed space 54 due to the included air column 58. In the preferred embodiment, the included air column 58 is composed of a plurality of substantially identical air columns 58 arranged side-by-side in a linear array. For exemplary purposes, the array of air columns 58 is shown disposed in the bottom wall 52, however the included air column 58 can be formed in any one or more of the side walls 48, top wall 50 and bottom wall 52.

The included air columns 58 of the subject invention are effective to reduce the amount of heat energy that passes from the engine 12 and other heat sources to the component(s) placed inside the housing 46. This is particularly advantageous in applications where the fuel supply system 16 must pass regulations, such as USCG Fire Test CFR 183.590, without leaking fuel externally. Air has a much lower thermal conductivity than most materials of construction (metals, plastics, etc.). Therefore, the included air columns 58 provide an effective and lightweight thermal insulator, with the additional benefit of reducing noise transmission from components located inside the housing 46. Therefore, a passenger in the marine vessel 10 is less likely to hear sound produced by the high pressure pump 28 when it is disposed inside the housing 46. A still further benefit provided by the included air columns 58 relates to the potential material reductions that a hollow core construction provides. This translates to both cost and weight savings among other benefits.

Figure 9:
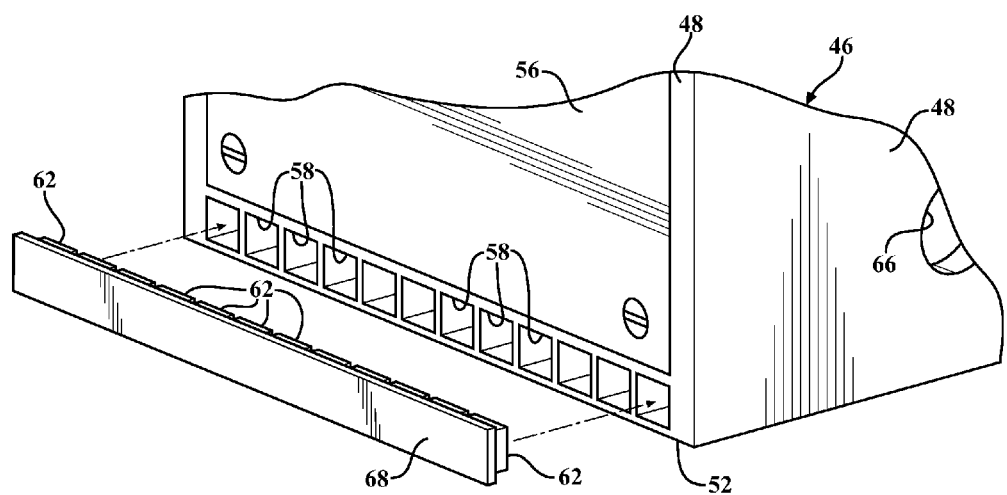
FIG. 9 is a fragmentary perspective view showing an alternative embodiment whereby a plurality of ganged plugs may be used to enclose the linear array of included air columns.
Figure 10:
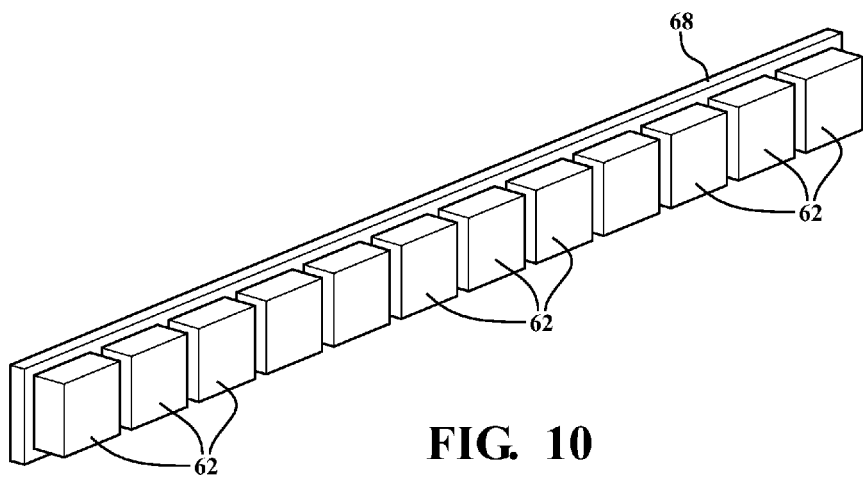
FIG. 10 is a perspective view of the ganged plug arrangement of FIG. 9.

Preferably, each included air column 58 is formed as an elongated chamber extending between opposite ends. Each end is sealed, preferably, to trap air inside. One end 60 of each included air column 58 may be stopped by the perpendicularly adjoining wall. In the example shown in FIG. 7, the end 60 is stopped by the side wall 48. The opposite end of the included air column 58 may be stopped with a plug 62. Thus, during the manufacturing process, the housing 46 may be made from a plastic forming operation with mold cores used to form the included air columns 58. Upon withdrawal of the cores the included air columns 58 are formed with open ends that may be subsequently sealed off with plugs 62 which, as shown in FIGS. 4, 7 and 8 may be loose piece members affixed in position with a suitable adhesive or welded. Alternatively, the plugs 62 may be ganged together on a backer 68 for simultaneously sealing the plurality of included air columns 58. Thus, FIGS. 9 and 10 depict an alternative embodiment wherein all of the plugs 62 are joined together with the strip-like backer 68. Other methods may be used to form the included air columns 58 and to seal them so as to trap air inside and capture air for its thermal insulating qualities.

FIGS. 4-7 illustrate exemplary mounting features 64 extending from the exterior of the housing 46. These are shown as tab-like extensions with holes to receive fasteners for mounting the housing 46 to an appropriate surface or object. Of course, many other mounting strategies can be used to secure the housing 46 within the marine vessel 10.

FIGS. 4-7 illustrate the several conduit ports 66 which extend through the walls 48, 50, 52 for transmitting fluids into and out of the housing 46. For example, the conduit ports 66 may be used to route electrical wires, the return line 30, vapor line 34, fuel outlet 38 and fuel inlet 42 conduits through the housing 46 to the respective components located in the enclosed space 54. Grommets or other suitable gasket or packing features may be interposed between the various wires, conduits and the conduit ports 66 for abrasion resistance.

The foregoing invention has been described in accordance with the relevant legal standards, thus the description is exemplary rather than limiting in nature. Variations and modifications to the disclosed embodiment may become apparent to those skilled in the art and fall within the scope of the invention.

What is claimed is:

1. A spill resistant fuel supply system for a marine engine, the fuel supply system comprising:
   a vapor separator having:
      a vapor separator housing that encloses a vapor separator chamber that is configured to receive liquid fuel from a fuel tank via a supply line, and
      a vent valve device configured to enable fuel vapor to escape from the vapor separator chamber;
   a high pressure pump configured to pump fuel under positive pressure from the vapor separator chamber to an internal combustion engine;
   a containment housing that includes surrounding walls that enclose a containment space that (i) contains the vapor separator and the high pressure pump and (ii) is configured to contain fuel leaked from the vapor separator and from the high pressure pump, wherein the containment space is isolated by the vapor separator housing from the vapor separator chamber, and wherein at least one of the walls is an insulating wall, and wherein the insulating wall extends in a longitudinal direction and a lateral direction that are perpendicular to each other;
   a laterally-extending series of openings along a laterally-extending edge of the insulating wall;
   chambers that are within the insulating wall and elongated in the longitudinal direction and spaced apart in the lateral direction, wherein each of the chambers extends longitudinally from a respective one of the openings to a closed end of the respective chamber;
   a series of plugs, each plug being inserted in a respective one of the openings to seal the opening, leaving an air space that extends, within the respective chamber, from the respective plug to the closed end of the respective chamber; and
   a strip that gangs the plugs together, with a spacing between adjacent plugs that matches a spacing between adjacent openings, to facilitate inserting the plugs into the openings simultaneously, wherein the strip is attached to each plug at an end of the plug that projects longitudinally-away from the closed end of the respective chamber.

2. The system of claim 1 wherein the chambers are substantially identical.

3. The system of claim 1 wherein each chamber has a cross-section, perpendicular to the longitudinal direction, that is generally square.

4. The system of claim 1 wherein the containment housing includes a removable cover to provide access to the containment space of the containment housing.

5. The system of claim 1 wherein the containment housing includes at least one conduit port extending through the surrounding walls.

6. The system of claim 1 wherein the containment housing includes at least one mounting feature extending therefrom.

7. The system of claim 1 further including a low pressure pump configured to pump the fuel under negative pressure from the fuel tank to the vapor separator chamber.

8. A method comprising:
   forming an insulating wall that extends in a longitudinal direction and a lateral direction that are perpendicular to each other, wherein the insulating wall defines (i) a laterally-extending series of openings along a laterally-extending edge of the insulating wall and (ii) chambers that are within the insulating wall and elongated in the longitudinal direction and spaced apart in the lateral direction, and wherein each of the chambers extends longitudinally from a respective one of the openings to a closed end of the respective chamber;
   forming a plug strip that includes (i) a series of plugs, each plug being configured to be inserted in a respective one of the openings to seal the opening, and (ii) a strip that, prior to insertion of the plugs into the openings, gangs the plugs together with a spacing between adjacent plugs that matches a spacing between adjacent openings of the insulating wall, to facilitate inserting the plugs into the openings simultaneously;
   inserting each plug into a respective one of the openings, leaving an air space that extends, within the respective chamber, from the respective plug to the closed end of the respective chamber;
   forming a containment housing that includes walls, including the insulating wall, that together enclose a containment space;
   locating, in the containment space, a vapor separator that includes (i) a vapor separator housing that encloses a vapor separator chamber that is configured to receive liquid fuel from a fuel tank via a supply line and (ii) a vent valve device configured to enable fuel vapor to escape from the separator pressure chamber;
   locating, in the containment space, a high pressure pump configured to pump fuel under positive pressure from the vapor separator chamber to an internal combustion engine;
   wherein the containment housing is configured to contain fuel leaked from the vapor separator and fuel leaked from the high pressure pump; and
   wherein the containment space is isolated by the vapor separator housing from the vapor separator chamber.

9. The method of claim 8, wherein the forming of the insulating wall includes forming the insulating wall in a molding operation by (i) first forming the chambers with mold cores and (ii) then withdrawing the mold cores from the chambers through the openings.

10. The method of claim 8 wherein the chambers are substantially identical.

11. The method of claim 8 wherein each chamber has a cross-section, perpendicular to the longitudinal direction, that is generally square.

12. An apparatus comprising:
   an insulating wall that extends in a longitudinal direction and a lateral direction that are perpendicular to each other, wherein the insulating wall defines (i) a laterally-extending series of openings along a laterally-extending edge of the insulating wall and (ii) chambers that are within the insulating wall and elongated in the longitudinal direction and spaced apart in the lateral direction, and wherein each of the chambers extends longitudinally from a respective one of the openings to a closed end of the respective chamber;

a plug strip including:
- a series of plugs, each plug configured to be inserted in a respective one of the openings to seal the opening and leave an air space that extends, within the respective chamber, from the respective plug to the closed end of the respective chamber, and
- a strip that is configured to, prior to insertion of the plugs into the openings, gang the plugs together with a spacing between adjacent plugs that matches a spacing between adjacent openings of the insulating wall, to facilitate inserting the plugs into the openings simultaneously;

additional walls that, together with the insulating wall, are configured to form a containment housing that encloses a containment space for containing (i) a vapor separator configured to receive liquid fuel from a fuel tank via a supply line, (ii) a high pressure pump configured to pump fuel under positive pressure from the vapor separator chamber to an internal combustion engine, (iii) fuel leaked from the vapor separator, and (iv) fuel leaked from the high pressure pump.

13. The apparatus of claim 12 wherein the chambers are substantially identical.

14. The apparatus of claim 12 wherein each chamber has a cross-section, perpendicular to the longitudinal direction, that is generally square.

\* \* \* \* \*